United States Patent
Weedermann et al.

(10) Patent No.: US 11,726,941 B2
(45) Date of Patent: Aug. 15, 2023

(54) SYSTEM AND METHOD FOR MODULAR MANAGEMENT GATEWAY APPARATUS

(71) Applicant: VERTIV IT SYSTEMS, INC., Huntsville, AL (US)

(72) Inventors: Joerg Weedermann, Santa Clara, CA (US); Haralson K. Reeves, Jr., Gadsden, AL (US); Donald A. Sturgeon, Huntsville, AL (US); Agustin Roca, Gainesville, FL (US)

(73) Assignee: VERTIV IT SYSTEMS, INC., Huntsville, AL (US)

( * ) Notice: Subject to any disclaimer, the term of this patent is extended or adjusted under 35 U.S.C. 154(b) by 0 days.

(21) Appl. No.: 17/475,946

(22) Filed: Sep. 15, 2021

(65) Prior Publication Data

US 2023/0040451 A1 Feb. 9, 2023

Related U.S. Application Data

(60) Provisional application No. 63/228,950, filed on Aug. 3, 2021.

(51) Int. Cl.
*G06F 13/40* (2006.01)
*G06F 13/42* (2006.01)
(Continued)

(52) U.S. Cl.
CPC ........ *G06F 13/4068* (2013.01); *G06F 13/105* (2013.01); *G06F 13/4282* (2013.01);
(Continued)

(58) Field of Classification Search
CPC ............... G06F 13/4068; G06F 13/105; G06F 13/4282; G06F 2213/0042; G08B 5/36; H04L 12/10; H04L 12/66
See application file for complete search history.

(56) References Cited

U.S. PATENT DOCUMENTS

| 7,502,878 B1 * | 3/2009 | Wright ................ G06F 13/4022 710/37 |
| 7,788,412 B2 * | 8/2010 | Guo ........................ G09G 5/363 710/1 |

(Continued)

OTHER PUBLICATIONS

International Search Report and Written Opinion regarding International Application No. PCT/US2021/063966, dated Apr. 25, 2022.

*Primary Examiner* — Henry Tsai
*Assistant Examiner* — Harry Z Wang
(74) *Attorney, Agent, or Firm* — Harness, Dickey & Pierce, P.L.C.

(57) ABSTRACT

The present disclosure relates to a modular management gateway apparatus for providing keyboard, video and mouse communications with a target device in communication with the apparatus. The apparatus may have a housing with a field programmable gate array (FPGA) housed within the housing. An uplink port is included to enable communication between a user operated device and the apparatus via a network. A memory is used for containing a software module for carrying out at least one operating feature of the apparatus. A video compression hardware and software subsystem is used for providing 4K video transfer between the apparatus and the target device. A USB-C enables video signals and serial data to be communicated between the apparatus and the target device.

19 Claims, 4 Drawing Sheets

(51) Int. Cl.
*H04L 12/10* (2006.01)
*H04L 12/66* (2006.01)
*G06F 13/10* (2006.01)
*G08B 5/36* (2006.01)

(52) U.S. Cl.
CPC .............. *G08B 5/36* (2013.01); *H04L 12/10* (2013.01); *H04L 12/66* (2013.01); *G06F 2213/0042* (2013.01)

(56) References Cited

U.S. PATENT DOCUMENTS

| | | | |
|---|---|---|---|
| 7,818,486 B2 * | 10/2010 | McLeod | H04L 69/32 710/316 |
| 2006/0215339 A1 * | 9/2006 | Camagna | H04L 12/10 361/90 |
| 2010/0011355 A1 * | 1/2010 | Carrigan | G06F 3/1462 718/1 |
| 2012/0113265 A1 * | 5/2012 | Galvin | H04N 21/2187 348/E7.085 |
| 2015/0373372 A1 | 12/2015 | He et al. | |
| 2016/0127671 A1 * | 5/2016 | Hundal | C01B 32/05 348/723 |
| 2016/0191379 A1 * | 6/2016 | Sung | H04L 47/52 370/389 |
| 2017/0336768 A1 * | 11/2017 | Geffin | G06F 1/206 |
| 2018/0316943 A1 * | 11/2018 | Todd | H04N 21/6587 |
| 2020/0326955 A1 * | 10/2020 | Adiletta | G06F 1/1684 |
| 2021/0112261 A1 | 4/2021 | Hwang et al. | |
| 2022/0011874 A1 * | 1/2022 | Soffer | G06F 13/102 |

\* cited by examiner

SYSTEM AND METHOD FOR MODULAR MANAGEMENT GATEWAY APPARATUS

CROSS-REFERENCE TO RELATED APPLICATIONS

This application claims the benefit of U.S. Provisional Application No. 63/228,950, filed on Aug. 3, 2021. The entire disclosure of the above application is incorporated herein by reference.

FIELD

The present disclosure relates generally to remote access appliances such as Keyboard, Video and Mouse ("KVM") appliances, and more particularly to a modular, scalable, high performance and compact, high security remote access gateway device that is able to be used over both local and wide area networks to perform KVM-like operations in communicating with, and/or controlling, and/or powering a wide variety of remotely located devices.

BACKGROUND

The statements in this section merely provide background information related to the present disclosure and may not constitute prior art.

At the present time there is a need for high performance, remote management capabilities that exceed what can be found in a single legacy Keyboard, Video and Mouse (KVM) device or a presently available serial console appliance. Increased performance of these devices is needed for the development, test and manufacturing of laptops and game systems in a globally distributed environment. In such an environment, the remote access of laptops, game systems and other computing devices under test requires a much more robust access/management solution with significantly improved video capability, that is, video capability that can redirect 4K video at frame rates exceeding 30 frames per second, over a Wide Area Network (WAN), and with low latency of mouse and keyboard input from the remote tester. In addition, the ability to access the BIOS of the device under test, as well as the ability to configure and update the software of the device under test, is needed.

Still further, a closely related need is the development, test and manufacturing of server hardware and systems. More than 95% of servers incorporate, on a motherboard or other circuit board within the device, an embedded processor, often referred to as a "service processor" or a "Baseboard Management Controller" ("BMC"). For clarification, a service processor or BMC may be defined broadly as a specialized controller embedded in servers and other computing and data center devices. For convenience, the following discussion will refer to service processors and BMCs collectively as BMCs.

A BMC often comes in the form of a system-on-chip (SoC), with its own CPU, memory, storage, and with diverse input/output ("I/O") capabilities. The BMC connects to sensors within its associated device (e.g., server) to read environmental conditions, and to fans to control temperature within its associated device. It also provides other system management functions, for example and without limitation, including remote power control, serial communication over LAN, and monitoring and error logging of the server host CPU and memory (e.g., see https://engineering.fb.com/2015/03/10/open-source/introducing-openbmc-an-open-software-framework-for-next-generation-system-management/).

In the development, testing and manufacturing of servers that incorporate a BMC, remote users require the ability to access both the host server desktop and the embedded BMC, usually at the same time from boot, or using the BIOS through server and BMC OS runtime.

At the present time, remote access appliances are commercially available that can provide low-latency KVM access over a broadband network, but such access is only available at video resolutions below 4K. Similarly, high performance KVM appliances are presently available that can provide 4K video resolution and low latency response, but only over closed, dedicated networks (often referred to as "management networks").

What is needed in the industry at the present time is a portable and scalable remote access device that is capable of serving the roles of high performance KVM over a wide area network, acting as a serial appliance and access gateway to one or more nodes, and which is able to operate equally well as part of a vertically integrated system or as a stand-alone remote access solution. A device with the just-mentioned capabilities would be able to serve as a multipurpose platform for many varied use-cases and deployment models. And it will be appreciated that the needs and requirements for secure remote access of devices in manufacturing and test applications are a superset of the needs required for device management in a data center, network closet or even consumer devices.

SUMMARY

This section provides a general summary of the disclosure, and is not a comprehensive disclosure of its full scope or all of its features.

In one aspect the present disclosure relates to a modular management gateway apparatus for providing keyboard, video and mouse communications with a target device in communication with the apparatus. The apparatus may comprise a housing having a field programmable gate array (FPGA) housed within the housing. An uplink port may be mounted on the housing and in communication with the FPGA, and configured to enable communication between a user operated device and the apparatus via a network. A memory may be housed within the housing for containing a software module for carrying out at least one operating feature of the apparatus. A video compression hardware and software subsystem may also be housed within the housing for providing 4K video transfer between the apparatus and the target device. A USB-C port may be mounted on the housing and configured to enable video signals and serial data to be communicated between the apparatus and the target device.

In another aspect the present disclosure relates to a modular management gateway system for providing keyboard, video and mouse communications with a target device in communication with the apparatus. The system may comprise a modular gateway apparatus for providing keyboard, video and mouse communications with the target device, and a primary interface module. The modular gateway apparatus may include a housing, a field programmable gate array (FPGA) housed within the housing, and a primary uplink port mounted on the housing and in communication with the FPGA, and configured to enable communication between a user operated device and the apparatus via a network. The modular gateway apparatus may further include a memory for containing a software module for implementing at least one application programming interface (API) for use with the apparatus, a video compression hardware and software subsystem housed in the housing for providing 4K video transfer between the apparatus and the target device, and a USB-C port mounted on the housing and configured to enable video signals and serial data to be communicated between the apparatus and the target device.

In still another aspect the present disclosure relates to a method for providing keyboard, video and mouse communications with a target device. The method may comprise providing an apparatus having a compact, readily portable housing having a field programmable gate array (FPGA) housed within the housing. The method may further include using an uplink port mounted on the housing, and in communication with the FPGA, to enable communication between a user operated device and the apparatus, via a network. The method may further include using a memory operably associated with the FPGA to contain a software module for carrying out at least one operating feature of the apparatus. The method may further include performing a video compression operation to assist in transferring 4K video signals between the target device and the user operated device. The method may further include using a USB-C port on the housing to enable both 4K video signals and serial data signals to be communicated between the apparatus and the target device.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

The present disclosure relates to a remote access apparatus which forms a platform comprised of systems and software that enable methods for secure remote access and control of devices, as described above, over local or wide area networks. This is accomplished by the novel integration of hardware and software into a single, compact, modular and readily portable apparatus that provides users with the capability of a BMC. Unlike a BMC, however, these capabilities are not embedded into a host device (i.e., not part of a server or like computing device) but rather are provided in the stand-alone apparatus of the present disclosure. The apparatus is also able to communicate 4K KVM video quality at 30 FPS or better between the apparatus and a target device.

The integration of the following systems, software and methods creates a novel remote access apparatus, which may also be termed a "remote access appliance". The apparatus is expected to find utility with data center professionals who need remote access to query and control various devices (e.g., servers) in a modern day data center, as well as the capability to transmit and receive 4K video, and while performing with low keyboard and mouse latency.

Figure 1:
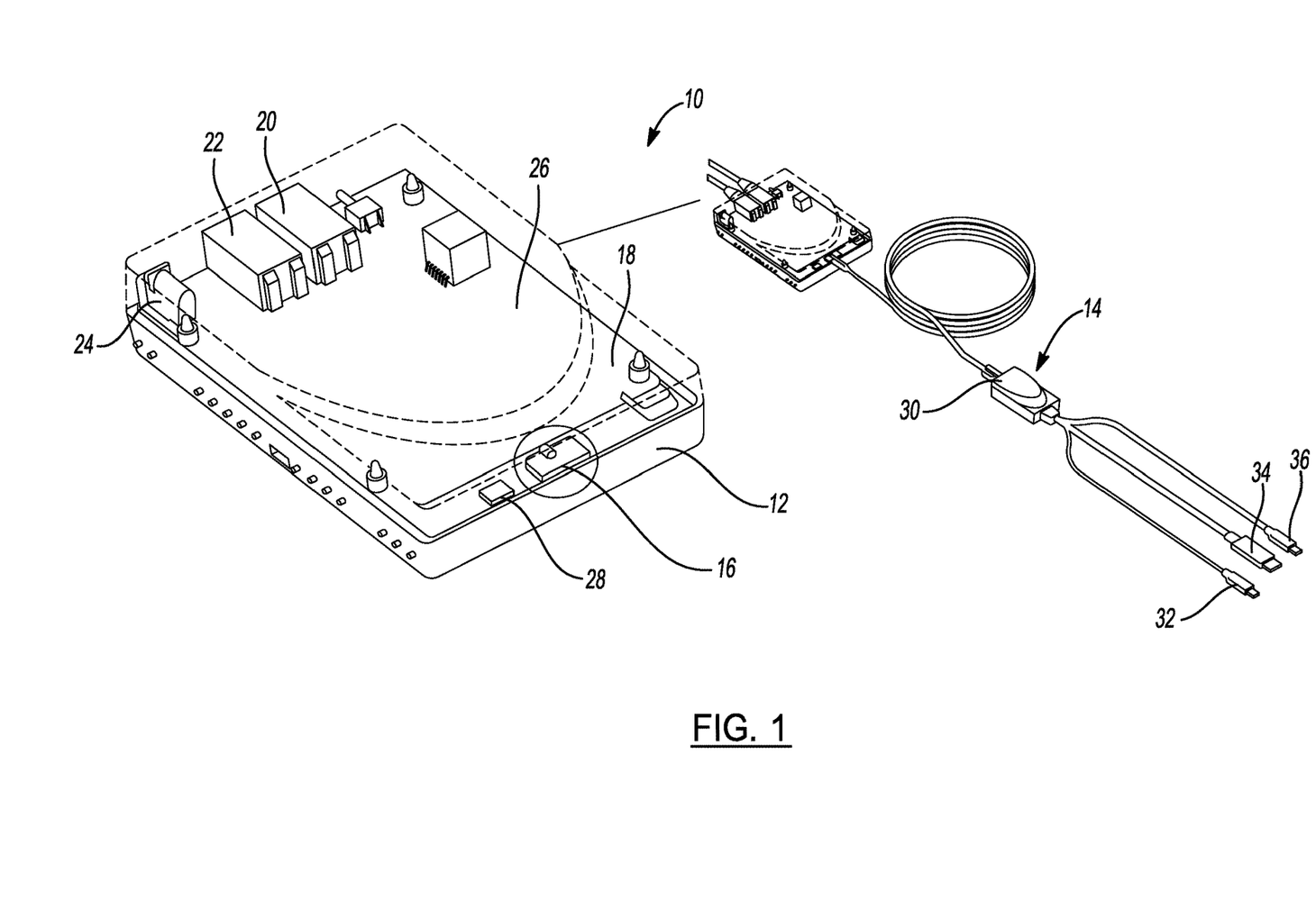
FIG. 1 is a perspective illustration of one embodiment of a modular management gateway apparatus in accordance with the present disclosure, with a portion of the housing shown in transparency, to reveal various internal components, and with one example of an interface module also shown for interfacing the apparatus to a target device to enable both serial and video communications with the target device, and where the interface module includes three connectors for enabling three different video connection options including Display Port (DP), HDMI or Video Graphics Adaptor (VGA)

Referring to FIG. 1, one embodiment of a modular management gateway apparatus 10 in accordance with the present disclosure is shown (hereinafter simply "apparatus 10"). The apparatus 10 includes a housing 12, which in this example is a two-piece housing secured together by external fasteners (not shown). A USB-C primary interface module 14 (not part of the apparatus 10) may be coupled to a USB C port 16 which is supported on a circuit board 18 within the housing 12. The circuit board 18 also includes a primary 1G (1 gigabyte) uplink RJ45 female port 20 (having Power-Over-Ethernet or "POE") and a second 1G uplink RJ45 female port 22. These two uplink ports 20 and 22 form two "north-bound" (i.e., upstream) network uplink nodes, the operations of which will be further described in the following paragraphs. The primary 1G uplink port 20 provides the important benefit of providing POE Type II (i.e., +5 vdc) to power the apparatus 10. This eliminates excessive cabling and leverages a resource (i.e., POE) available in many in data centers.

The apparatus 10 further includes a power jack 24 for coupling to a power cord (not shown) to provide DC power to the apparatus 10. Optionally, the power jack 24 could be configured to receive AC power, provided suitable rectification componentry is provided in the apparatus 10. The power jack 24 enables operation of the apparatus 10 if Power-Over-Ethernet ("POE") is not available. The ability to power the apparatus using POE enables the apparatus 10 to be potentially be used in locations where no AC power is available, but where a connection to a network enables the POE provided by the network connection to power the apparatus 10. The circuit board 18 also includes a number of additional electronic components, indicated in highly simple, diagrammatic form by raised portion 26, which will be discussed in detail in connection with FIG. 3.

A micro USB port 28 is also provided which enables serial-over-USB communications with a target device, for example a server in a data center. The micro USB port 28 also enables the configuration and/or control of the apparatus 10 via a mobile device (e.g., laptop, tablet, smartphone, PDA, etc.) via a USB connection. Optionally, as will be discussed in connection with FIG. 3, a wireless transceiver (e.g., BLUETOOTH® protocol transceiver) may be provided in the apparatus 10 to provide a wireless connection link with a user mobile device.

The USB-C primary interface module 14 in this example provides a USB-C male connector 30 for interfacing to the USB-C port 16 of the apparatus 10, and Display Port (DP) connector a HDMI connector 34 and a VGA connector 36. In a preferred implementation the USB-C primary interface module 14 also includes an additional USB connector 74 (e.g., USB 2.0, 3.0, etc.), which is visible in FIG. 6. The connectors 32, 34 and 36 thus provide a wide variety of capabilities for coupling to different types of video ports commonly used on present day target devices. The USB-C primary interface module 14 converts the target device's video interface (e.g., DP, HDMI or VGA) output, as well as the target device's USB (serial) output to a USB-C interface mapped to a USB-C data path.

A principal feature and advantage of the apparatus 10 is its highly compact and lightweight configuration. This enables the apparatus 10 to be easily moved and transported to different areas where users may need to use the apparatus 10 to remotely access various devices. In one embodiment the apparatus 10 has a form factor of only 4.1 inches in width×6.6 inches in length×1.6 inches in height (105 mm×168 mm×41 mm), and a weight of typically about 0.73 pounds (0.332 kg). As such, the apparatus 10 can be easily hand carried by an individual and moved from one location to another with ease. These dimensions also provide for 0U (e.g., mounting outside a rack or inside the rack but without needing any rack shelf space) and 1U rack mount options in a standard data center equipment rack, in the event one wishes to rack mount the apparatus 10.

Figure 2:
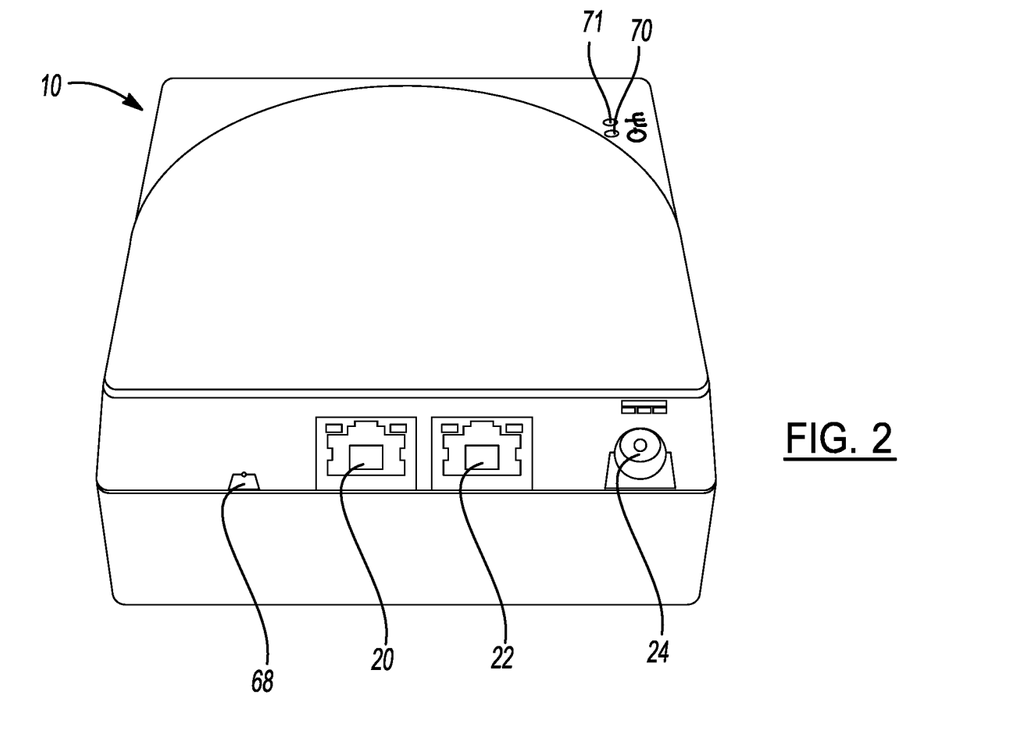
FIG. 2 is a front perspective illustration of the apparatus of FIG. 1.
Figure 3:
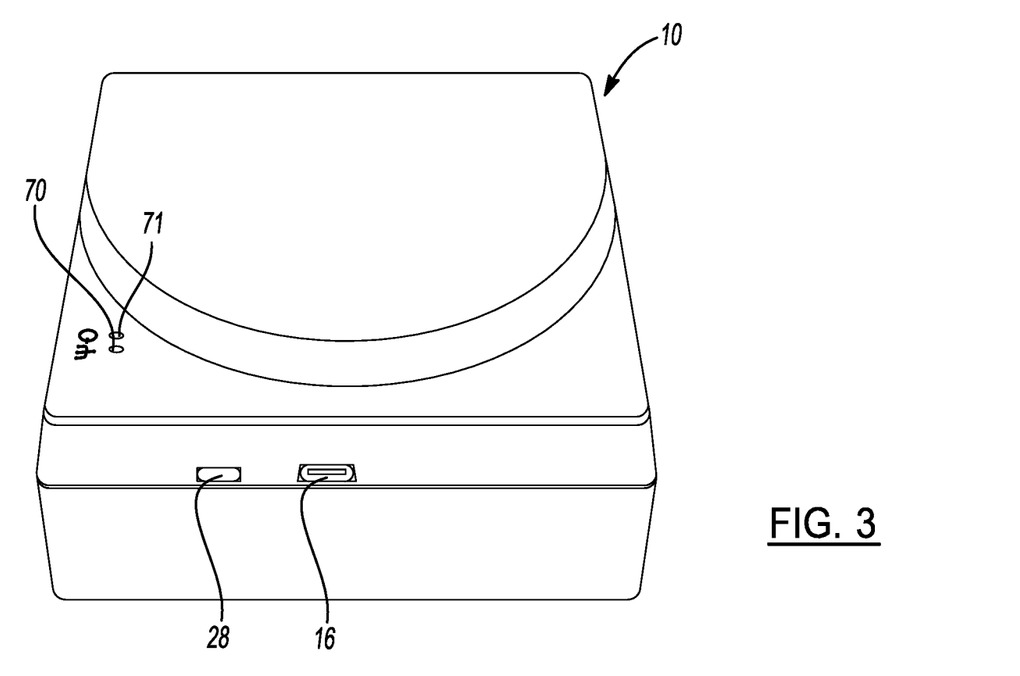
FIG. 3 is a rear perspective illustration of the apparatus illustrating the USB-C and Micro-USB ports on the apparatus.

FIGS. 2 and 3 provide front and rear perspective illustrations, respectively, of the apparatus 10, and further illustrate its various ports and controls. FIGS. 2 and 3 also further highlight the extremely compact overall configuration of the apparatus.

Figure 4:
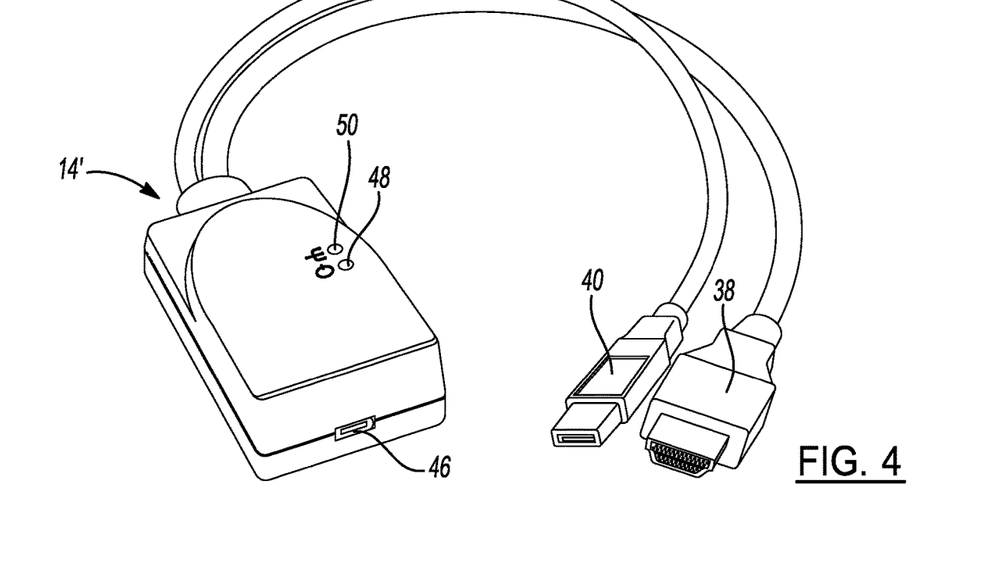
FIG. 4 is a perspective view of another embodiment of the interface module in which only HDMI and USB Type A connectors are used as options for interfacing the apparatus to a video port of a target device.
Figure 5:
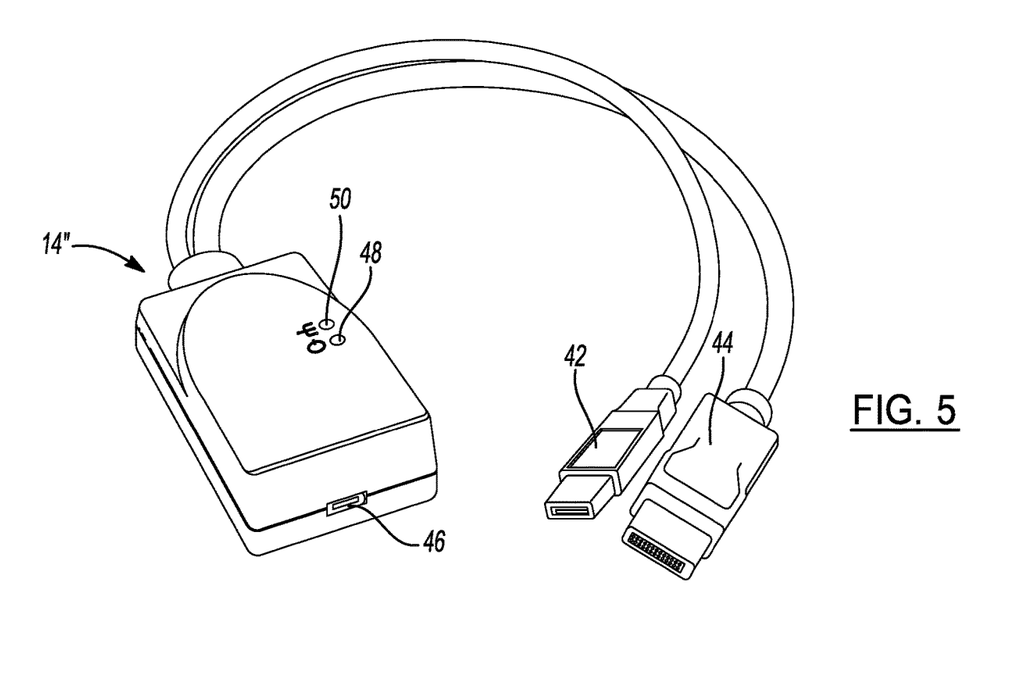
FIG. 5 is a perspective view of another embodiment of the interface module in which only Display Port (DP) and USB Type A connectors are used for interfacing the apparatus to corresponding types of video ports of a target device.

FIGS. 4 and 5 are perspective views of additional different embodiments of a USB-C primary interface module 14' (FIG. 4) and a USB-C interface module 14" (FIG. 5) for connecting the apparatus 10 with a target device. The USB-C primary interface module 14' in this example includes an HDMI connector 38 for making a video connection with the target device and a USB Type A connector 40 for making the serial connection. A USB-C port 46 on each module 14' and 14" enables connection to the USB-C port 16 on the apparatus 10 via a separate USB-C cable (not shown). The USB-C primary interface module 14", however, instead incorporates a Display Port (DP) connector 44 for making the video connection and a USB Type A connector 42 for making the serial connection.

The USB-C primary interface modules 14' and 14" shown in FIGS. 4 and 5 also each include a Power LED 46 and a multifunction Status LED 50. The Power LED 48 can be used to not only indicate that power is being applied to the apparatus 10 (e.g., illuminated solid red), but also in a blinking state to indicate that firmware is booting up, as well as providing a different color to indicate another operational status (e.g., the color green to indicate if a video signal is available or not). The Status LED 50 provides a convenient means for providing a location indication (e.g., blinking blue to help identify the apparatus 10 during a location finding operation) or to indicate a firmware updating operation is in progress (e.g., blinking red color), or to provide a visual indication of any other information that may be helpful to installing, operating, updating or troubleshooting the system 10.

Figure 6:
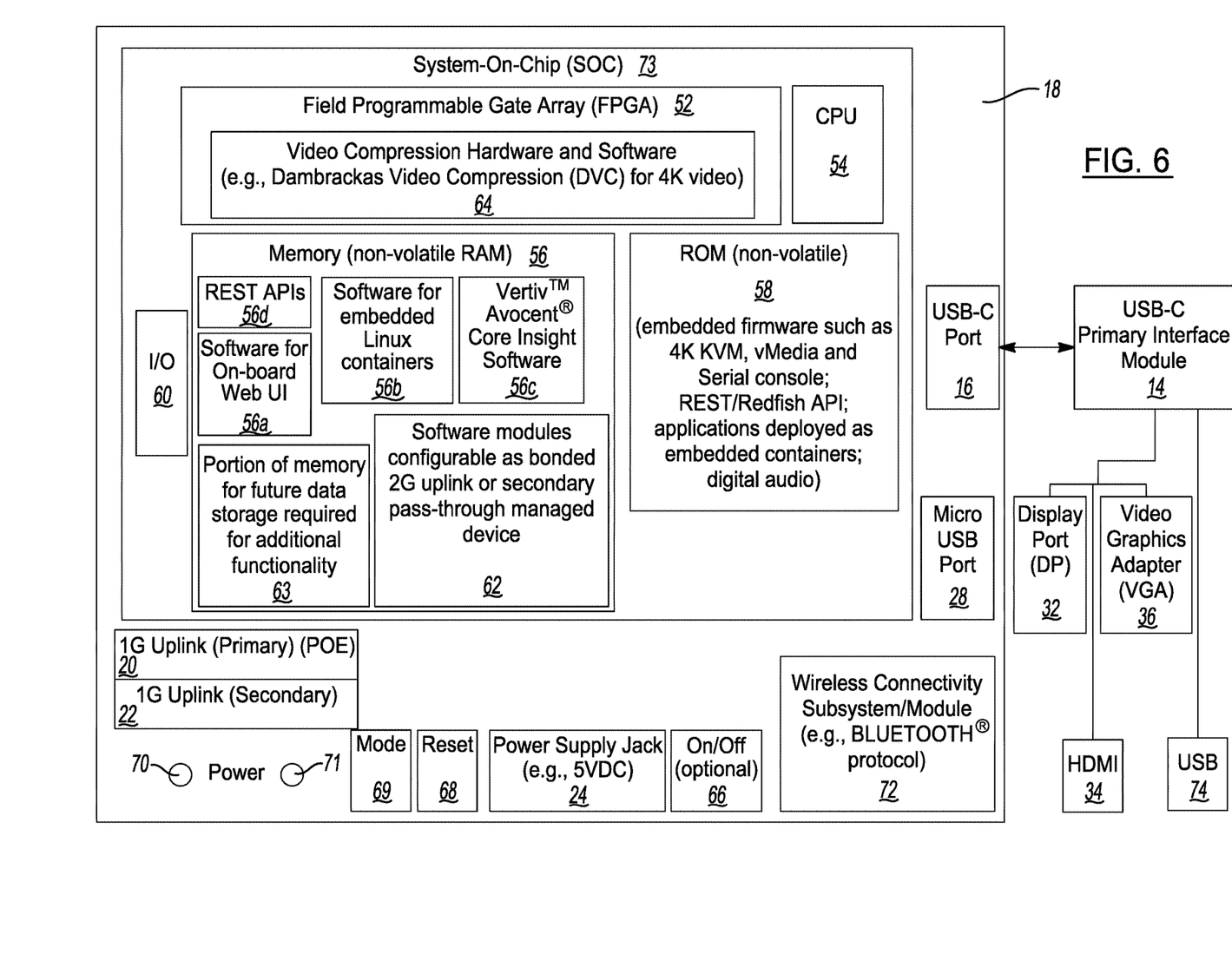
FIG. 6 is a high level block diagram of the apparatus (not including the interface modules) showing various internal subsystems of the apparatus.

Referring now to FIG. 6, a high level block diagram of various components and subsystems of the apparatus 10 shown in FIG. 1 can be seen, many of which comprise the components indicated by reference number 26 in FIG. 1. Various ones of the components specifically identified in FIG. 1 are also shown in FIG. 3 but in simplified block diagram form.

Mounted on the circuit board 16 of the apparatus 10 is a System-On-Chip ("SOC") 73. The SOC has integrated in it a plurality of components and subsystems including a Field Programmable Gate Array ("FPGA") 52 and a CPU 54. The FPGA 52 may include a video compression hardware and software subsystem 64 (e.g., Dambrackas Video Compression (DVC)) for handling 4K video. The CPU 54 may be formed by, for example, a microprocessor or microcontroller. The SOC 73 may further include a first memory (e.g., non-volatile RAM) 56, a second memory (e.g., non-volatile ROM) 58, and an Input/Output (I/O) subsystem 60 for assisting with handling communications between the apparatus 10 and a user's device (e.g., laptop, tablet, etc.) as well as a target device. The first memory 56 may further store one or more software modules 56a for implementing an On-board Web user interface (UI). An additional portion of the memory 56 may be used to store one or more software modules 56b for implementing embedded Linux containers (i.e., minimal file systems with required components to run one or more specified applications). Another portion of the memory 56 may be used for storing Vertiv™ Avocent® Core Insight software 56c. Still another portion of the memory 56d may be used for storing REST ("Representational State Transfer") APIs ("Application Program Interfaces"). The ROM 58 may store embedded firmware such as for carrying out 4K KVM. The ROM 58 may also store vMedia and serial console firmware; a REST/Redfish API, applications deployed as embedded containers, and firmware for implementing digital audio. The addition of digital audio in ROM 58 is also tied to the USB-C primary interface module 14; the HDMI capability of the module 14 allows digital audio to be mapped to the module 14.

The SOC 73 may further include one or more software modules 62 configurable as a bonded 2G uplink, or configurable to enable the apparatus to operate as a secondary pass-through managed device. An additional portion 63 of the memory 56 may be dedicated (set aside) for future data storage needs brought on by additional functionality added into the apparatus 10.

The two 1G uplink ports 20 and 22 form the interfaces where a user can access the apparatus 10 and the external south-bound devices it will manage, which may be referred to as "nodes". The two 1G uplink ports 20 and 22 can be configured via the software module(s) 62 for three distinct modes of operation:

1) In a "bonded" mode to provide greater data throughput, up to a factor of 2, when needed. Network bonding is used for hot standby, encompassing fail over and load balancing. Both modes will be used in different use cases. Additionally if future applications involve even further increased KVM data transfer (i.e., 8K), the primary 1 Gb uplink port (20) will not be sufficient, but the secondary 1 Gb uplink port 22 will be available to help meet this need.

2) In a "fail-over" mode from the primary uplink 20 to the secondary uplink 22, to improve resiliency if the network connection to the primary uplink fails. In this regard both of the 1G interfaces 20 and 22 will be monitored by the FPGA 52 and the fail-over decision will be used for redundancy.

3) As a gateway where other platforms or computers on a network can be connected to the apparatus's 10 1G secondary uplink port 22. The data traffic from the various nodes which the apparatus 10 is in communication with can be processed by the apparatus 10 or routed directly to the user, to a management software subsystem (not shown), or to another data consumer on the north-bound network via the 1G primary uplink port 20.

With further reference to FIG. 6, the apparatus 10 also may include an optional ON/OFF switch 66. A "Reset" switch 68 is provided for enabling a user to perform a "hard" reset of the apparatus 10 without removing power to the apparatus. An LED 70 is provided to indicate that the apparatus 10 is receiving power. A multi-purpose LED 71 is provided which may be used to indicate status of functionality of the apparatus 10, and/or for identifying the apparatus and its location within the rack and data center. Optionally, a wireless connectivity module 72 may be provided to enable a wireless connection with the user's device (e.g., laptop, tablet, smartphone, PDA, etc). The wireless connection may be established, in one example, by using a BLUETOOTH® communications protocol, although virtually any suitable wireless protocol could be used.

The micro USB port 28 enables the apparatus 10 to be configured by a user using a mobile device (e.g., laptop, tablet, etc.) or through a computer via the USB-network. Additionally, the micro USB port 28 can be used as a dedicated interface to manage a node using SSH (Secure Shell) or similar serial protocol. The flexibility of this micro-USB is achieved through its USB-on-the-Go capability.

The USB-C port 16 enables the apparatus 10 to be connected to a server or a laptop, which each may be viewed as forming a node. This enables direct management of the node using virtual Keyboard, Video and Mouse (vKVM) functionality. The USB-C port can also be used as an expansion port to interconnect to a hub for multipart vKVM operations (i.e., 1 to N), to a sensor block, or to a wide variety of other peripheral devices, for example a video camera.

The inclusion of USB-C port 16 also provides the apparatus 10 with the ability to provide power (e.g., +5 VDC) to downstream (i.e., "southbound") devices in communication with the apparatus 10, using the USB PD fast charge standard. The USB-C capability also enables the apparatus 10 to source power from upstream ("north bound") devices. The CPU 54 prioritizes available power such that if power is present at the power supply jack 24, this power is used to power the apparatus 10, regardless if Power-Over-Ethernet is available at the 1G primary uplink port 20. However, other power prioritization schemes may be implemented as well, and the present disclosure is not limited to any one specific power prioritization scheme.

The above described benefits of the USB-C capability that the apparatus 10 includes extend beyond providing additional options for powering southbound (i.e., downstream) devices, and extend to enabling the handling of bidirectional 4K video data. The apparatus 10, with its USB-C capability, enables 4K KVM video to be delivered over a wide area network with extremely low latency.

The integration of USB-C for video access in a KVM-type appliance is a significant advancement for a remote access, KVM-like device such as the apparatus 10. This essentially "future-proofs" the design of the apparatus 10 for emerging trends in computing and provides a differentiating level of flexibility to handle use cases beyond those described specifically above. For example, the apparatus 10, with its USB-C capability, can be used in combination with accessory boards, cables, power systems, and mechanical housings to serve a variety of roles usually served by single-purpose devices like KVM appliances, serial console switches or gateways.

The inclusion of Vertiv™ Avocent® Core Insight software 56c, which is based on the open source OpenBMC framework, enables the apparatus 10 deliver a variety of additional important capabilities that have heretofore not been available on a KVM-like device. For example, software applications can be deployed on the apparatus 10 as Embedded Linux containers and stored in portion 56b of the memory 56. This enables faster and more robust feature development and the ability for users to deploy custom business logic tailored to the needs of a given user. Another feature is that the software for the On-board Web UI (OBWI) 56a provides a graphical user interface to users with system status, configuration and security information and data pertaining to the managed device. The software 56d provides the REST APIs for users to access the target devices programmatically via software or scripting. The data and capabilities provided over the REST APIs mirror that provided by the OBWI described above. This interface can also be used by higher-level management software to connect to and manage the apparatus 10 and its subtending target(s).

As an additional feature, the system 10 and its software (i.e., components 56a-56d, 62 and 64) provide methods of security using industry standards and partner tools. The apparatus 10 and its software provide methods for securing all communication across all north-bound physical and virtual interfaces using industry standard protocols. The apparatus 10 and its software provide a method of verifying and booting the software image securely using signed images (i.e., using Vertiv™ Avocent® Core Insight software 56c). This is a significant enhancement over prior KVM-like devices.

The apparatus 10 and its software, in particular the Vertiv™ Avocent® Core Insight software 56c, also provide a method of exchanging and authenticating credentials that securely establishes trust with Vertiv™ Avocent® ADX software products. The apparatus 10 and its software provide a method of protecting against common security attacks that exploit known memory patterns and bugs in the software. These capabilities represent additional significant enhancements over prior KVM-like devices.

The apparatus 10 and its software enable methods for vKVM sessions to the managed node. The use of vKVM gives the user the ability to interact with the target remotely, via a network, as if the user were sitting directly in front of the target. For example, the user can see and configure the node's BIOS environment on start-up, using the apparatus 10. The vKVM methods redirect node video data (its graphical user interface such as desktop or windows) using the apparatus 10 to a remote northbound ("upstream") user. The vKVM operations performed by the apparatus 10 redirect remote user input to the southbound node as if the input was being directly applied through a local keyboard or mouse to the southbound node. The user can access this capability of the apparatus 10 through either a browser (HTML5) or a dedicated client.

The apparatus 10 and its software also provide a method of virtual Media (vMedia) operation with the managed node. The vMedia functions allows a remote, northbound user the ability to attach, read and move data between the remote user station and the managed node using the apparatus 10. This enables the apparatus 10 and its software to leverage use of its video compression hardware and software 64 with Vertiv's Dambrackas Video Compression (DVC) technology to enable 4K quality video and keyboard and mouse input from node to user, over a wide area network with minimal latency. The hardware compressor portion of the subsystem 64 can be easily field-updated to support new or expanded compression technologies that may arise in the future. This ability to easily update the apparatus 10 to accommodate and/or implement newer technologies is a significant advancement over the capabilities of prior developed KVM-like devices.

The apparatus 10 and its software also provide a method of location tracking via the identification LED 71 which can be remotely activated by the user from the OBWI 56*a*. Also a mode push button 69 (FIG. 6) may optionally be included for assisting a user in cycling through status and various actions on the apparatus 10.

The apparatus 10 further provides the ability to access and manage the platform via a REST API (included as part of the REST APIs 56*d*) that supports DMTF Redfish schemas. This is an extension of the BMC software capability that is provided via the Vertiv™ Avocent® Core Insight software 56*c*.

The apparatus 10 also provides the ability to store private keys, in a hardware root of trust, for use with authentication tokens that help establish and maintain trust with upstream management devices. The apparatus 10 also includes the ability to deploy and update containerized applications (via the Linux containers 56*b*) and features on the apparatus's 10 embedded operating system during runtime. This allows users to deploy and execute custom business logic and intelligence on the apparatus 10, which capability has not been available on previously developed remote access KVM-like devices. Still further, the apparatus 10 provides the ability to connect to a managed device via serial on the Micro-USB interface 28.

The apparatus 10 described herein thus provides a plethora of enhancements and new capabilities that have not been heretofore provided in previous KVM-like devices. These enhancements and capabilities are expected to provide significantly improved flexibility to users in accessing northbound and southbound systems and devices in a highly secure manner. The ability of the apparatus 10 to handle 4K video is a significant advance over prior remote access, KVM-like devices. The ability of the apparatus 10 to power southbound devices, as well as to source POE from a network connection, is also expected to provide significant utility to the apparatus.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A modular management gateway apparatus forming a standalone keyboard/video/mouse (KVM) remote access appliance configured to receive keyboard and mouse signals from a user operated device having a keyboard and a mouse, and to transmit the keyboard and mouse signals in a first direction to a target device located remotely from the KVM remote access appliance, and to receive video signals transmitted back from the target device in a second direction, and to transmit the received video signals back to the user operated device, the apparatus comprising:
- a housing;
- a field programmable gate array (FPGA) housed within the housing;
- a network uplink port mounted on the housing and in communication with the FPGA, and configured to receive an external network cable to enable communication between the user operated device and the apparatus via a network, and to simultaneously provide power to the apparatus;
- a memory housed within the housing for containing a software module for carrying out at least one operating feature of the apparatus;
- a video compression hardware and software subsystem housed within the housing for providing a transfer of 4K video received from the target device, in the second direction, to the user operated device between the apparatus and the target device;
- a USB-C port mounted on the housing and configured to enable video signals and serial data to be communicated between the apparatus and the target device, and to enable keyboard and mouse signals received from the user operated device to be passed by the apparatus to the target device; and
- each of the video compression hardware and software subsystem, the memory and the FPGA able to be separately powered using power received at the network uplink port when the external network cable is coupled to the network uplink port.

2. The apparatus of claim 1, further comprising an additional USB port mounted on the housing for enabling a serial connection with an external user device.

3. The apparatus of claim 2, wherein the additional USB port comprises a micro USB port.

4. The apparatus of claim 1, wherein the network uplink port comprises a 1 gigabyte (1G) uplink port having power-over-Ethernet (POE) capability.

5. The apparatus of claim 1, further comprising an additional uplink port mounted on the housing and in communication with the FPGA.

6. The apparatus of claim 5, wherein the additional uplink port comprises a secondary 1G uplink port.

7. The apparatus of claim 1, further comprising an additional software module stored in the memory for enabling an on-board Web user interface to be used by a user when accessing the apparatus.

8. The apparatus of claim 1, further comprising at least one additional software module stored in the memory for enabling use of embedded Linux containers.

9. The apparatus of claim 1, further comprising at least one additional software module stored in the memory for forming an application programming interface (API).

10. The apparatus of claim 9, wherein the API comprises a representational state transfer (REST) application programming interface.

11. The apparatus of claim 1, further comprising a plurality of software modules stored in the memory for configuring the apparatus to operate in at least one of a bonded uplink configuration or as a secondary pass-through managed device.

12. The apparatus of claim 1, further comprising firmware stored in the memory for implementing at least one of a virtual media (vMedia) communications capability or a serial console communications capability.

13. The apparatus of claim 1, further comprising a power supply jack mounted on said housing for receiving an external voltage signal to power the apparatus.

14. The apparatus of claim 1, further comprising at least one optical indicator mounted on the housing for indicating at least one of:
- power being applied to the apparatus; or
- an operational status of the apparatus.

15. The apparatus of claim 1, further comprising a wireless connectivity subsystem housed within the housing for enabling a wireless connection between the apparatus and an external user device.

16. A modular management gateway apparatus forming a standalone keyboard/video/mouse (KVM) remote access appliance, configured to receive keyboard and mouse signals in a first direction from a user operated device having a keyboard and a mouse, and to transmit the keyboard and mouse signals in the first direction to a target device located remotely from the KVM remote access appliance, and to receive video signals transmitted from the target device in a second direction, and to transmit the received video signals back to the user operated device in the second direction, the apparatus comprising:
- a housing;
- a field programmable gate array (FPGA) housed within the housing;
- a network primary uplink port mounted on the housing and in communication with the FPGA, and configured to receive an external network cable to enable communication between the user operated device and the apparatus via a network, and to simultaneously provide power to the apparatus;
- a memory for containing a software module for implementing at least one application programming interface (API) for use with the apparatus;
- a video compression hardware and software subsystem housed in the housing for providing 4K video transfer between the apparatus and the target device in the second direction;
- a USB-C port mounted on the housing and configured to enable video signals and serial data to be communicated between the apparatus and the target device in the second direction, and keyboard and mouse signals to be communicated to the target device in the first direction; and
- each of the video compression hardware and software subsystem, the memory and the FPGA able to be separately powered using power received at the network uplink port when the external network cable is coupled to the network uplink port.

17. The apparatus of claim 16, wherein:
the primary uplink port comprises a 1 gigabyte (1G) uplink port having power-over-Ethernet (POE) capability.

18. The apparatus of claim 16, further comprising:
- an additional USB port mounted on the housing of the modular management gateway apparatus for interfacing the modular management gateway apparatus with an additional external computing device;
- a secondary uplink port; and
- wherein the primary uplink port and the secondary uplink port each comprise 1 gigabyte (1G) uplink ports.

19. A method for providing keyboard, video and mouse communications between a user operated device and a target device, the method comprising:
providing an apparatus forming a standalone keyboard, video and mouse (KVM) remote access appliance configured to receive keyboard and mouse signals in a first direction from a user operated device having a keyboard and a mouse, and to transmit the keyboard and mouse signals in the first direction to a target device located remotely from the KVM remote access appliance, and to receive video signals transmitted from the target device in a second direction, and to transmit the received video signals back to the user operated device in the second direction, the KVM remote access appliance being located remotely from both the user operated device and the target device, the KVM remote access appliance having a compact, readily portable housing having a field programmable gate array (FPGA) housed within the housing;

using a network uplink port mounted on the housing, and in communication with the FPGA, to enable communication between the user operated device and the KVM remote access appliance, via a network, and to simultaneously provide power to the apparatus;

using a memory operably associated with the FPGA to contain a software module for carrying out at least one operating feature of the KVM remote access appliance;

performing a video compression operation to assist in transferring 4K video signals between the target device and the user operated device in the second direction;

using a USB-C port on the housing to enable 4K video signals and serial data to be communicated in the second direction from the target device to the user operated device, and to enable keyboard and mouse signals, to be communicated by the KVM remote access appliance to the target device from the user operated device; and providing each of the video compression hardware and software subsystem, the memory and the FPGA with the ability to be separately powered using power received at the network uplink port when the external network cable is coupled to the network uplink port.

\* \* \* \* \*